United States Patent
Otto et al.

(10) Patent No.: US 10,330,017 B2
(45) Date of Patent: Jun. 25, 2019

(54) THREE SPOOL GEARED TURBOFAN WITH LOW PRESSURE COMPRESSOR DRIVE GEAR SYSTEM

(71) Applicant: United Technologies Corporation, Hartford, CT (US)

(72) Inventors: John R. Otto, Middletown, CT (US); James B. Coffin, Windsor, CT (US); Jason Husband, South Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 528 days.

(21) Appl. No.: 14/902,058

(22) PCT Filed: Jul. 3, 2014

(86) PCT No.: PCT/US2014/045411
§ 371 (c)(1),
(2) Date: Dec. 30, 2015

(87) PCT Pub. No.: WO2015/006162
PCT Pub. Date: Jan. 15, 2015

(65) Prior Publication Data
US 2016/0138477 A1    May 19, 2016

Related U.S. Application Data

(60) Provisional application No. 61/845,520, filed on Jul. 12, 2013.

(51) Int. Cl.
*F02C 7/32*    (2006.01)
*F02C 7/36*    (2006.01)
(Continued)

(52) U.S. Cl.
CPC .......... *F02C 7/36* (2013.01); *F02C 3/10* (2013.01); *F02C 3/107* (2013.01); *F02K 3/06* (2013.01);
(Continued)

(58) Field of Classification Search
None
See application file for complete search history.

(56) References Cited

U.S. PATENT DOCUMENTS 3,971,208 A * 7/1976 Schwent ............... F02C 9/32
60/226.1
7,363,757 B2    4/2008 Loisy
(Continued)

FOREIGN PATENT DOCUMENTS

EP    1600615 A2    11/2005
EP    2009269 A2    12/2008
(Continued)

OTHER PUBLICATIONS

Extended European Search Report for EP Application No. 14823162.4 dated Jun. 24, 2016.
(Continued)

*Primary Examiner* — Kayla McCaffrey
(74) *Attorney, Agent, or Firm* — Carlson, Gaskey & Olds, P.C.

(57) ABSTRACT

A turbofan engine includes a fan rotatable about an axis and a compressor section including a high pressure compressor and a low pressure compressor. A turbine section includes a high pressure turbine, an intermediate turbine and a fan drive turbine. The high pressure turbine is coupled to drive the high pressure compressor. A fan drive gear system is driven by the fan drive turbine for driving the fan and a compressor drive gear system is driven by the intermediate turbine for driving the low pressure compressor.

16 Claims, 3 Drawing Sheets

(51) Int. Cl.
*F02K 3/06* (2006.01)
*F02C 3/10* (2006.01)
*F02C 3/107* (2006.01)

(52) U.S. Cl.
CPC .............. *F05D 2240/40* (2013.01); *F05D 2260/40311* (2013.01)

(56) References Cited

U.S. PATENT DOCUMENTS

| | | | |
|---|---|---|---|
| 8,297,917 B1* | 10/2012 | McCune | F01D 25/164 |
| | | | 415/124.1 |
| 2008/0060341 A1 | 3/2008 | Loisy | |
| 2008/0120839 A1 | 5/2008 | Schilling | |
| 2009/0074565 A1 | 3/2009 | Suciu et al. | |
| 2010/0218478 A1 | 9/2010 | Merry et al. | |
| 2011/0130246 A1* | 6/2011 | McCune | F01D 25/164 |
| | | | 477/115 |
| 2012/0015776 A1 | 1/2012 | Lemmers, Jr. | |
| 2012/0159923 A1 | 6/2012 | Freund et al. | |
| 2012/0198816 A1* | 8/2012 | Suciu | B64D 27/26 |
| | | | 60/226.3 |
| 2013/0000323 A1* | 1/2013 | Kupratis | F02C 7/36 |
| | | | 60/801 |
| 2013/0025257 A1 | 1/2013 | Suciu et al. | |
| 2013/0104524 A1 | 5/2013 | Kupratis | |

FOREIGN PATENT DOCUMENTS

| | | |
|---|---|---|
| EP | 2233721 A1 | 9/2010 |
| EP | 2518293 A2 | 10/2012 |
| EP | 2610464 A2 | 7/2013 |

OTHER PUBLICATIONS

International Search Report and Written Opinion for International Application No. PCT/US2014/045411 dated Oct. 22, 2014.
International Preliminary Report on Patentability for International Application No. PCT/US2014/045411 dated Jan. 21, 2016.

* cited by examiner

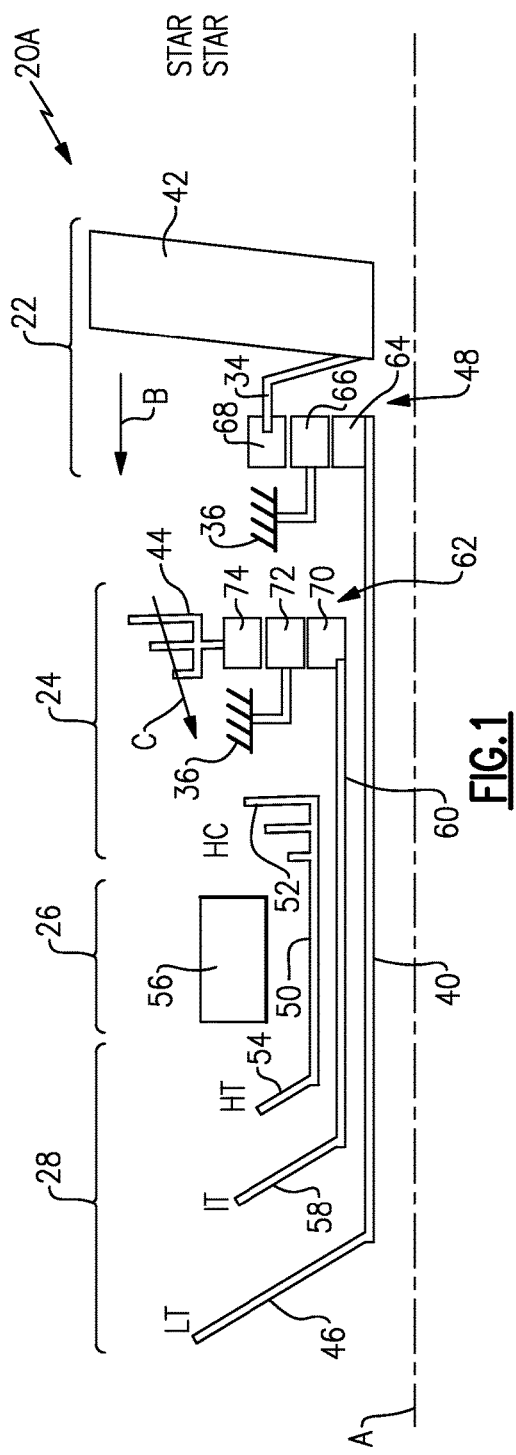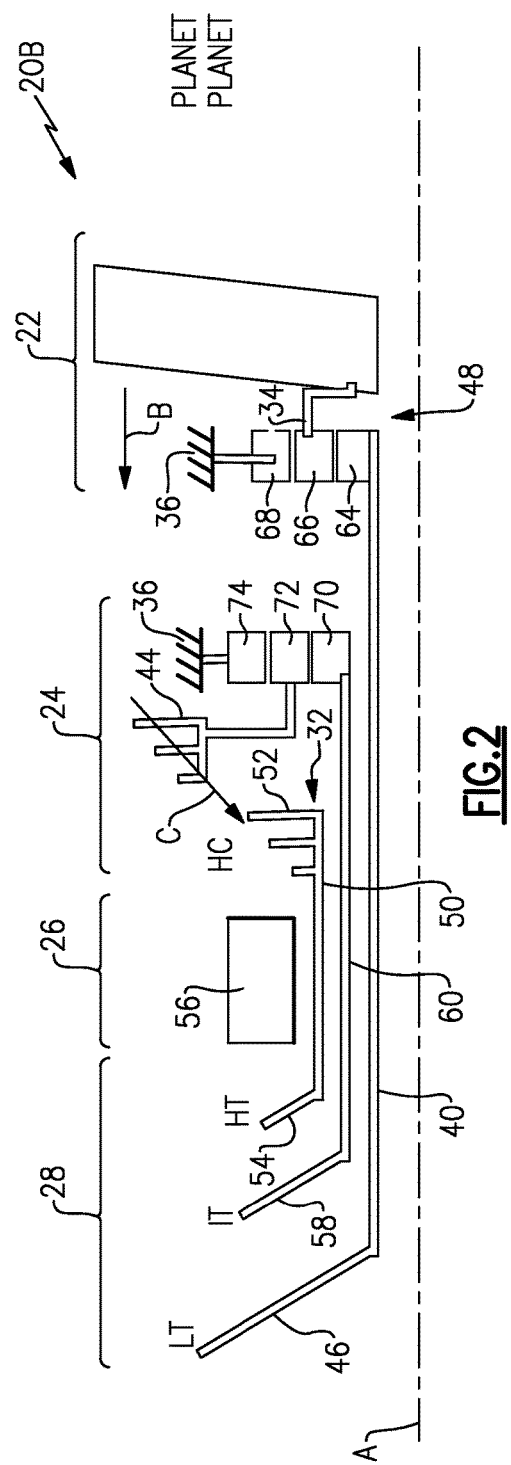

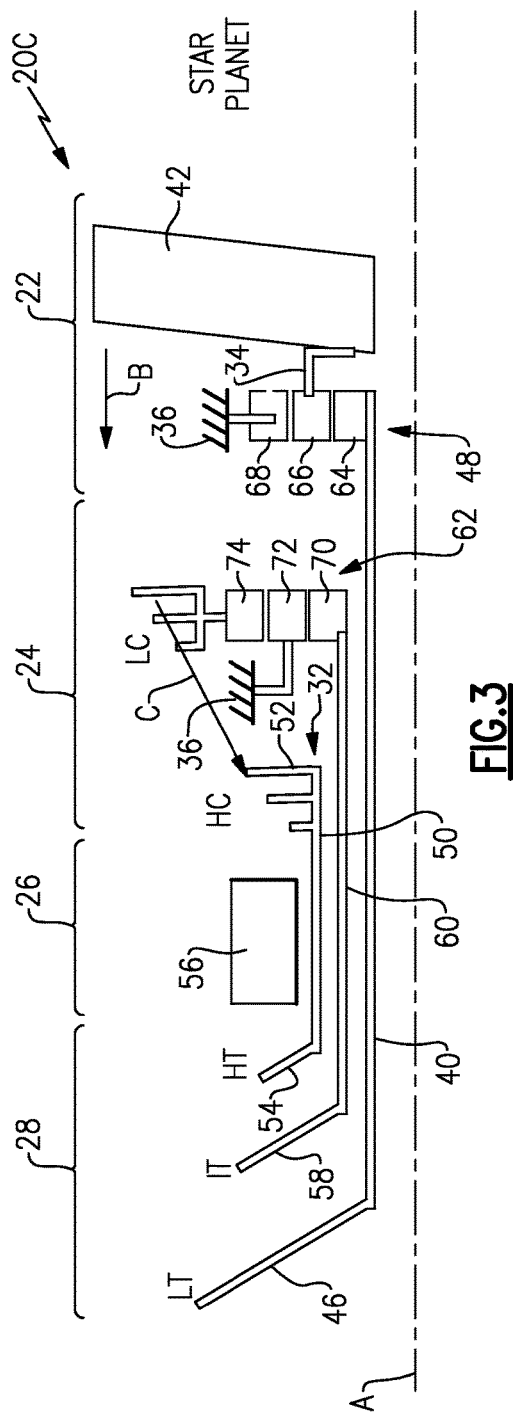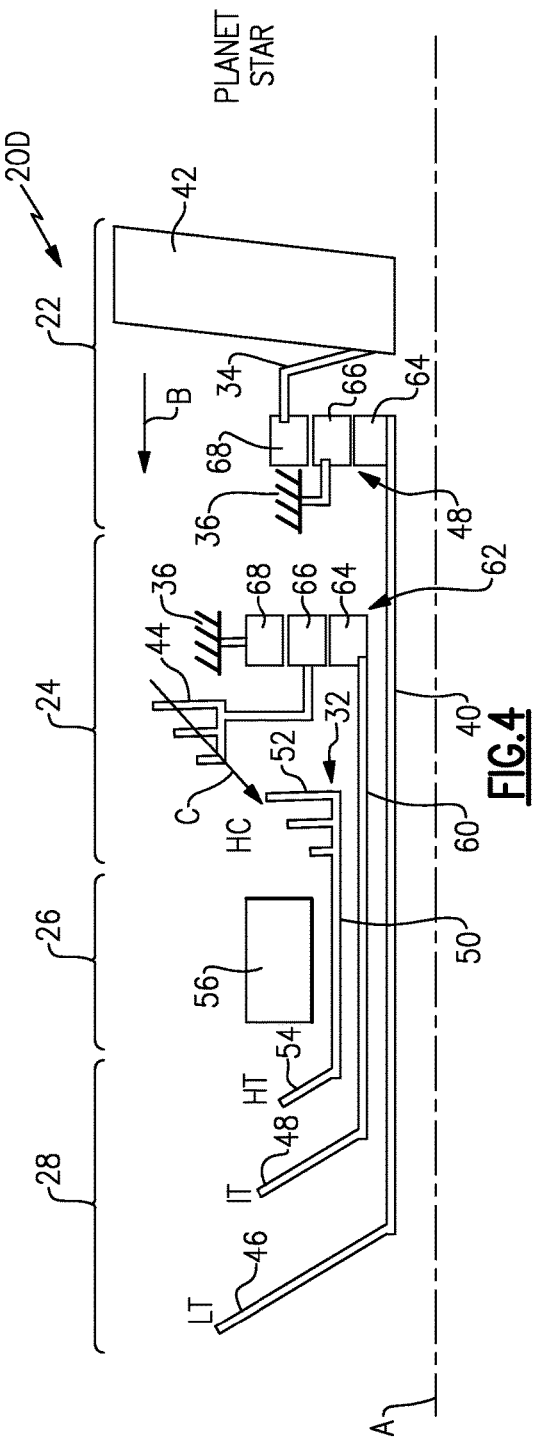

THREE SPOOL GEARED TURBOFAN WITH LOW PRESSURE COMPRESSOR DRIVE GEAR SYSTEM

REFERENCE TO RELATED APPLICATION

This application claims priority to U.S. Provisional Application No. 61/845,520 filed on Jul. 12, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The compressor section may include low, intermediate and high pressure compressors, and the turbine section can include low, intermediate and high pressure turbines. The high pressure turbine drives the high pressure compressor through an outer shaft to form a high spool. The intermediate turbine drives an intermediate compressor and forms an intermediate spool and the low pressure turbine drives the low pressure compressor through an inner shaft to form a low spool.

The fan section may also be driven by the low spool. In a direct drive gas turbine engine includes a fan section driven by the low spool such that the low pressure compressor, low pressure turbine and fan section rotate at a common speed in a common direction. In some 3-spool gas turbine configurations, the low pressure compressor is driven by the intermediate turbine and the low pressure turbine is utilized only to drive the fan section. The separation of the low pressure compressor form the low pressure turbine provides for rotation at different more efficient speeds.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Although geared architectures have improved propulsive efficiency, turbine engine manufacturers continue to seek further improvements to engine performance including improvements to thermal, transfer and propulsive efficiencies.

SUMMARY

A turbofan engine according to an exemplary embodiment of this disclosure, among other possible things includes a fan rotatable about an axis, a compressor section including a high pressure compressor and a low pressure compressor, a turbine section including a high pressure turbine, an intermediate turbine and a fan drive turbine. The high pressure turbine is coupled to drive the high pressure compressor. A fan drive gear system is driven by the fan drive turbine for driving the fan. A compressor drive gear system is driven by the intermediate turbine for driving the low pressure compressor.

In a further embodiment of the foregoing turbofan engine, the fan drive gear system includes a sun gear, a plurality of planet gears and a ring gear circumscribing the plurality of planet gears.

In a further embodiment of any of the foregoing turbofan engines, a low shaft driven by the fan drive turbine drives the sun gear, the plurality of planet gears rotate about a corresponding plurality of fixed axes and the ring gear is coupled to the fan.

In a further embodiment of any of the foregoing turbofan engines, the low shaft driven by the fan drive turbine drives the sun gear, the ring gear is fixed to ground and the planet gears rotate about the sun gear to drive the fan.

In a further embodiment of any of the foregoing turbofan engines, the low shaft driven by the fan drive turbine drives the plurality of planet gears about the sun gear, the ring gear is fixed to a static structure and the sun gear rotates to drive the fan.

In a further embodiment of any of the foregoing turbofan engines, the compressor drive gear system includes a sun gear, a plurality of planet gears and a ring gear circumscribing the plurality of planet gears.

In a further embodiment of any of the foregoing turbofan engines, an intermediate shaft driven by the intermediate turbine drives the sun gear, the plurality of planet gears rotate about a corresponding plurality of fixed axes and the ring gear is coupled to drive the low pressure compressor.

In a further embodiment of any of the foregoing turbofan engines, an intermediate shaft driven by the intermediate turbine drives the sun gear, the ring gear is fixed to ground and the planet gears rotate about the sun gear and are coupled to drive the low pressure compressor.

In a further embodiment of any of the foregoing turbofan engines, an intermediate shaft driven by the intermediate turbine drives the plurality of planet gears about the sun gear, the ring gear is fixed to a static structure and the sun gear is coupled to drive the low pressure compressor.

In a further embodiment of any of the foregoing turbofan engines, the fan drive gear system includes a gear reduction ratio between about 2.3.

In a further embodiment of any of the foregoing turbofan engines, the compressor drive gear system includes a gear reduction between about 2.3.

A turbofan engine according to an exemplary embodiment of this disclosure, among other possible things includes a fan rotatable about an axis and driven by a fan drive turbine through a first speed reduction device. The fan rotates at a speed slower than the fan drive turbine. A compressor section includes a high pressure compressor and a low pressure compressor. A turbine section includes a high pressure turbine and an intermediate pressure turbine. The high pressure turbine is coupled to the high pressure compressor to rotate at common speed and the intermediate turbine drives the low pressure turbine through a second speed reduction device at a speed slower than the intermediate pressure turbine.

In a further embodiment of the foregoing turbofan engine, the first speed reduction system includes a fan drive gear system including a sun gear, a plurality of planet gears and a ring gear circumscribing the plurality of planet gears.

In a further embodiment of any of the foregoing turbofan engines, the fan drive gear system includes a gear reduction ratio between about 2.3.

In a further embodiment of any of the foregoing turbofan engines, the second speed reduction system includes a compressor drive gear system including a sun gear, a plurality of planet gears and a ring gear circumscribing the plurality of planet gears.

In a further embodiment of any of the foregoing turbofan engines, the compressor drive gear system includes a gear reduction between about 2.3.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 1 is a schematic view of an example three spool gas turbine engine.

FIG. 2 is another example of a three spool gas turbine engine.

FIG. 3 is a schematic view of another example three spool gas turbine engine.

FIG. 4 is a schematic view of another example three spool gas turbine engine.

DETAILED DESCRIPTION

Figure 5:
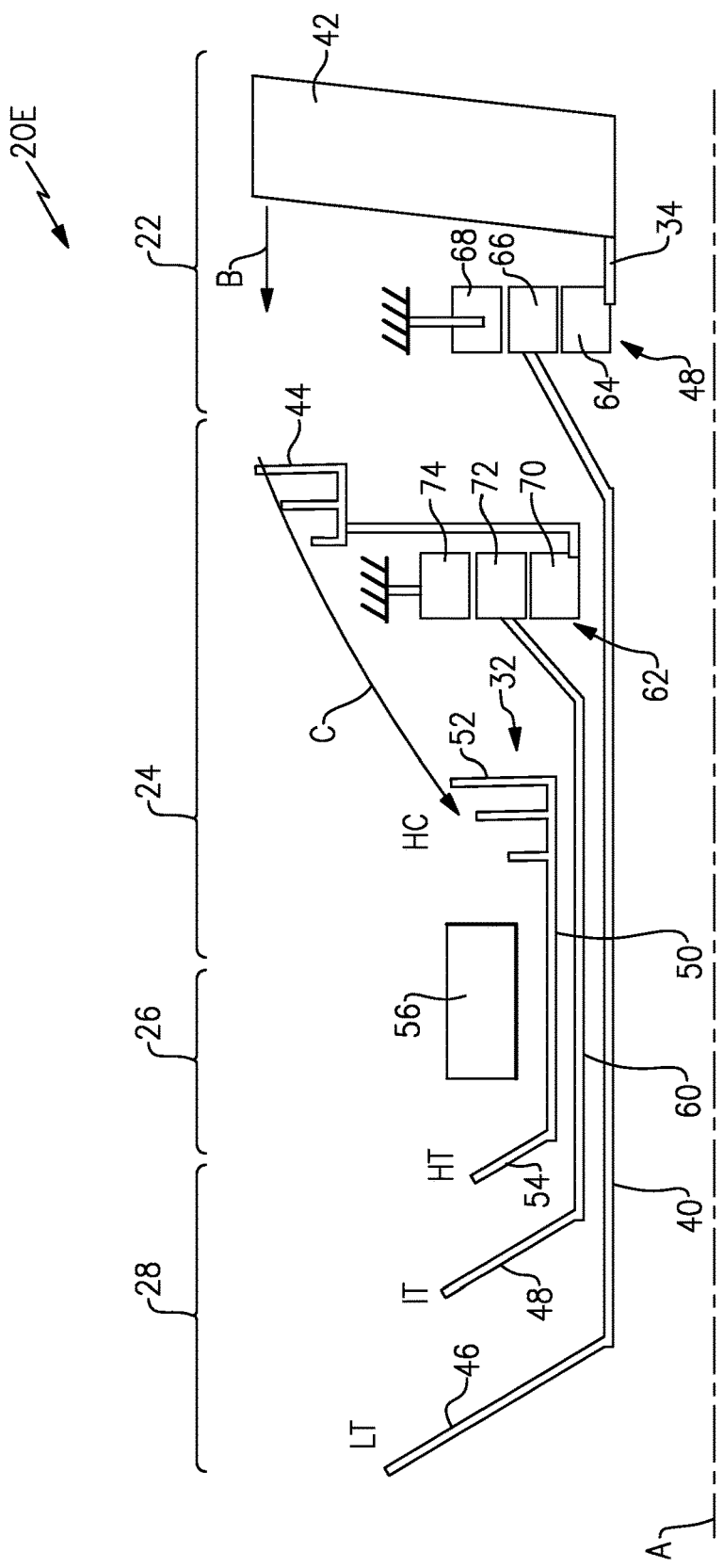
FIG. 5 is a schematic view of yet another three spool gas turbine engine.

FIG. 1 schematically illustrates an example gas turbine engine 20A that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

The example engine 20A generally includes a low pressure turbine 46 driving an inner shaft 40, an intermediate pressure turbine 58 driving an intermediate shaft 60 and a high pressure turbine driving an outer shaft 50 mounted for rotation about an engine central longitudinal axis A relative to an engine static structure 36. The outer shaft 50 is coupled to a high pressure compressor 52 to form a high spool 32.

The low pressure turbine 46 drives inner shaft 40 that in turn drives the fan 42 through a speed change device, such as a geared architecture 48, to drive the fan 42 at a lower speed than a low pressure turbine 46. Accordingly, the low pressure turbine 46 is also referred to as the fan drive turbine. The example intermediate pressure turbine 46 drives a compressor drive gear system 62 that in turn drives a low pressure compressor 44. A combustor 56 is arranged between the high pressure compressor 52 and the high pressure turbine 54.

In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine. Similarly, the "intermediate pressure" turbine encounters a pressure less than that of the high pressure turbine and greater than that of the low pressure turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54, intermediate turbine 58 and low pressure turbine 46.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3. Moreover, the compressor drive gear system 62 may also include a gear reduction ratio of greater than about 2.3

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by airflow through the bypass flow path B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades.

The example gas turbine engine 20a includes the turbine section 28 that has an intermediate turbine 58 that drives the compressor drive gear system 62. The low pressure turbine 46 drives the geared architecture 48 through the inner shaft 40.

The geared architecture 48 includes a sun gear 64 that drives a plurality of planet gears 66 circumscribed by a ring gear 68. The planet gears 66 are fixed to rotate around a fixed axis and are grounded to a static structure 36 of the gas turbine engine 28. The ring gear 68 drives the fan 42 through a fan shaft 34. This configuration of the fan drive gear system 48 is referred to as a star gear system.

The intermediate turbine 58 drives the compressor drive gear system 62 such that the low pressure compressor 44 will rotate at a speed different than the intermediate turbine 58. Because the low pressure compressor 44 can be rotated at a speed different than the intermediate turbine, each of the intermediate turbine 58 and the low pressure compressor 44 can be configured to rotate at optimal speeds for each purpose. In other words, the low pressure compressor 44 can be driven at a speed that provides the most efficient work on the incoming core flow C and the intermediate turbine 58 can be driven at a speed providing optimal turbine efficiency.

In this example, the compressor drive gear system 62 includes a sun gear 70 that drives a plurality of planet gears 72 circumscribed by a ring gear 74. The ring gear 74 is coupled to the compressor 44 to drive the compressor 44. The plurality of planet gears rotate about fixed axis and are grounded to the static structure 36. This configuration of the compressor drive gear system 62 is referred to as a star gear system.

The fan drive gear system 48 and the compressor drive gear system 62 are separately configured to optimize relative speeds. Accordingly, the low pressure turbine 46 can be optimized to increase efficiency to drive only the fan 42 through the geared architecture 48. The isolation of the low pressure turbine 46 to drive only the fan 42 provides for both the fan 42 and the low pressure turbine 46 to operate at increased efficiency levels.

The intermediate turbine 58 driving only the low pressure compressor 44 through the compressor drive gear system 62 further provides for an optimization of both the intermediate turbine 58 and the low pressure compressor 44. By isolating the purpose of the intermediate turbine 58 from the other turbines 46, 54, each of the turbines 46, 58, and 54 can be optimized to increase efficiency and while also providing increased overall efficiency for the work extracted from the corresponding turbine sections.

Referring to FIG. 2, another example gas turbofan engine 20B includes the fan drive gear system 48 and the compressor drive gear system 62. In this example, the fan drive gear system 48 is a planet system with the ring gear 68 grounded and the fan 42 driven by rotation of the plurality of planet gears 66 about the sun gear 64.

The compressor drive gear system 62 illustrated in FIG. 2 is also a planet system where the ring gear 74 is fixed to a static engine structure 62 and the plurality of planet gears 72 are rotatable about the sun gear 70. This configuration of the fan drive gear system 48 and the compressor drive gear system are referred to as a planet gear system.

The different configuration of the fan drive gear system 48 and the compressor drive gear system 62 provides for different gear ratios to tailor a desired speed reduction of the low pressure compressor 44 and the fan section 22.

Referring to FIG. 3, another three spool turbofan engine 20c is illustrated and includes the compressor drive gear system 62 with the ring gear 74 attached to drive the low pressure compressor 44. The fan drive gear system in this gas turbofan engine 20c is driven by the plurality of planet gears 66 and includes the ring gear 68 that is fixed to the static structure 36.

Accordingly, the engine embodiment illustrated in FIG. 3 includes a star gear system for the compressor drive gear system 62 and a planetary gear system for the fan drive gear system 48.

Referring to FIG. 4, another example three spool gas turbofan engine 20d includes a compressor drive gear system 62 that is configured as a planet drive system. The sun gear 64 drives a plurality of planet gears 66 that in turn drive the low pressure compressor. The ring gear 68 circumscribing the plurality of planet gears 66 is fixed to the static structure 36.

The corresponding fan drive gear system 48 for the embodiment illustrated in FIG. 4 is a star gear system where the plurality of planetary gears 66 are fixed to the static structure 36 such that they do not rotate about the sun gear 64. The ring gear 68 is coupled to drive the fan 42 at a speed designated by the gear reduction ratio provided by the fan drive gear system 48.

Referring to FIG. 5, another gas turbofan three spool engine 20e is schematically illustrated and includes a fan drive gear system 48 that is driven by a coupling between the inner shaft 40 and the plurality of planetary gears 66 that rotate about the sun gear 64. In this embodiment, the ring gear 68 is fixed to the static structure 36, the planetary gears 66 are driven about the axis A by the inner shaft 40. The sun gear 64 is coupled to drive the fan 42 about the axis A.

Further in the disclosed embodiment illustrated in FIG. 5 the compressor drive gear system 62 includes the sun gear 70 coupled to drive the low pressure compressor 44 with the intermediate shaft 60 driving the plurality of planetary gears 72 about the sun gear 70 with the ring gear 74 fixed to the static structure 36.

Each of the disclosed example three spool turbofan engine configurations includes both the fan drive gear system 48 and a separate compressor drive gear system 62. The different and separate compressor and fan drive gear systems provide for the optimization of the corresponding turbine section and the corresponding compressor and fan sections. Accordingly, each of the turbine sections that drive a corresponding fan and low pressure compressor can be optimized to rotate at an increased efficiency level while the corresponding compressor gear system and fan drive gear system allow the corresponding compressor and fan to be rotated at closer to their optimal speeds to further improve overall engine propulsive thrust and efficiency.

Although an example embodiment has been disclosed, a worker of ordinary skill in this art would recognize that certain modifications would come within the scope of this disclosure. For that reason, the following claims should be studied to determine the scope and content of this disclosure.

What is claimed is:
1. A turbofan engine comprising:
a fan rotatable about an axis;
a compressor section including a high pressure compressor and a low pressure compressor;
a turbine section including a high pressure turbine, an intermediate turbine and a fan drive turbine; wherein the high pressure turbine is coupled to drive the high pressure compressor, wherein the low pressure compressor is driven by only the intermediate turbine;
a fan drive gear system driven by only the fan drive turbine for driving the fan; and
a compressor drive gear system driven by only the intermediate turbine for driving the low pressure compressor.

2. The turbofan engine as recited in claim 1, wherein the fan drive gear system includes a sun gear, a plurality of planet gears and a ring gear circumscribing the plurality of planet gears.

3. The turbofan engine as recited in claim 2, wherein a low shaft driven by the fan drive turbine drives the sun gear, the plurality of planet gears rotate about a corresponding plurality of fixed axes and the ring gear is coupled to the fan.

4. The turbofan engine as recited in claim 2, wherein a low shaft driven by the fan drive turbine drives the sun gear, the ring gear is fixed to ground and the planet gears rotate about the sun gear to drive the fan.

5. The turbofan engine as recited in claim 2, wherein a low shaft driven by the fan drive turbine drives the plurality of planet gears about the sun gear, the ring gear is fixed to a static structure and the sun gear rotates to drive the fan.

6. The turbofan engine as recited in claim 1, wherein the compressor drive gear system includes a sun gear, a plurality of planet gears and a ring gear circumscribing the plurality of planet gears.

7. The turbofan engine as recited in claim 6, wherein an intermediate shaft driven by the intermediate turbine drives the sun gear, the plurality of planet gears rotate about a corresponding plurality of fixed axes and the ring gear is coupled to drive the low pressure compressor.

8. The turbofan engine as recited in claim 6, wherein an intermediate shaft driven by the intermediate turbine drives the sun gear, the ring gear is fixed to ground and the planet gears rotate about the sun gear and are coupled to drive the low pressure compressor.

9. The turbofan engine as recited in claim 6, wherein an intermediate shaft driven by the intermediate turbine drives the plurality of planet gears about the sun gear, the ring gear is fixed to a static structure and the sun gear is coupled to drive the low pressure compressor.

10. The turbofan engine as recited in claim 1, wherein the fan drive gear system includes a gear reduction ratio of about 2.3.

11. The turbofan engine as recited in claim 1, wherein the compressor drive gear system includes a gear reduction of about 2.3.

12. A turbofan engine comprising:
a fan rotatable about an axis and driven by only a fan drive turbine through a first speed reduction device, wherein the fan rotates at a speed slower than the fan drive turbine;
a compressor section including a high pressure compressor and a low pressure compressor; and
a turbine section including a high pressure turbine and an intermediate pressure turbine, wherein the high pressure turbine is coupled to the high pressure compressor to rotate at common speed and only the intermediate turbine drives the low pressure compressor through a second speed reduction device at a speed slower than the intermediate pressure turbine.

13. The turbofan engine as recited in claim 12, wherein the first speed reduction system comprises a fan drive gear system including a sun gear, a plurality of planet gears and a ring gear circumscribing the plurality of planet gears.

14. The turbofan engine as recited in claim 13, wherein the fan drive gear system includes a gear reduction ratio of about 2.3.

15. The turbofan engine as recited in claim 12, wherein the second speed reduction system comprises a compressor drive gear system including a sun gear, a plurality of planet gears and a ring gear circumscribing the plurality of planet gears.

16. The turbofan engine as recited in claim 15, wherein the compressor drive gear system includes a gear reduction of about 2.3.

\* \* \* \* \*